United States Patent [19]

Corradi

[11] 4,324,609

[45] Apr. 13, 1982

[54] HUMIDIFIER ARRANGEMENT FOR A TRAVELLING HYDROPHILIC WEB

[75] Inventor: Gabriel Corradi, Soissons, France

[73] Assignee: Sarl dite: Astin-France-Assistance Technique Industrielle, France

[21] Appl. No.: 156,023

[22] Filed: Jun. 3, 1980

[30] Foreign Application Priority Data

Jun. 8, 1979 [FR] France .............................. 79 15212

[51] Int. Cl.[3] ...................... B32B 31/06; B32B 31/08; B32B 31/12; B05C 5/00

[52] U.S. Cl. .................................. 156/470; 118/315; 134/122 R; 156/378

[58] Field of Search ...................... 118/315, 316, 325; 134/64 R, 64 P, 122 R, 122 P; 239/551, 562; 156/470, 378

[56] References Cited

U.S. PATENT DOCUMENTS 1,433,713 10/1922 Fricker .......................... 239/551 X 3,452,710 7/1969 Hentschel ...................... 118/315 X 3,467,541 9/1969 Aronsson et al. .................... 427/32

3,625,743 12/1971 Watanabe ............................ 427/32

*Primary Examiner*—John P. McIntosh

*Attorney, Agent, or Firm*—Robert E. Burns; Emmanuel J. Lobato; Bruce L. Adams

[57] ABSTRACT

A humidifier arrangement for at least one web of travelling hydrophilic material is provided to distribute humidity in a pre-determined manner over the width of the web in order to correct a tendency to warping of a material formed by the connection of this web to a second web. The arrangement comprises a plurality of jets distributed transversely with respect to the direction of travel of the first web over a table and opposite to the path of at least one side of the latter. Means for individual regulation of the rate of flow of each jet is provided and comprise, for each jet, a slide for regulating the rate of flow through this jet. The various slides corresponding to the various jets are able to move longitudinally on the table so that the position of the slides on the table for a given regulation provides vizualization of the shape of the cross-section of the material which is to be corrected by this regulation.

6 Claims, 5 Drawing Figures

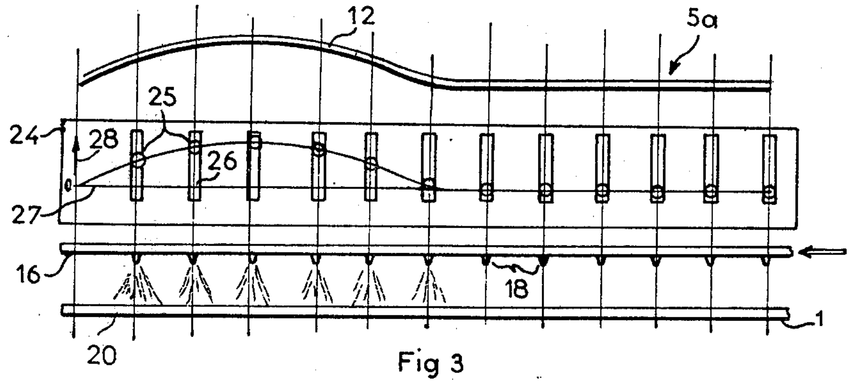
Fig 3
Fig 4
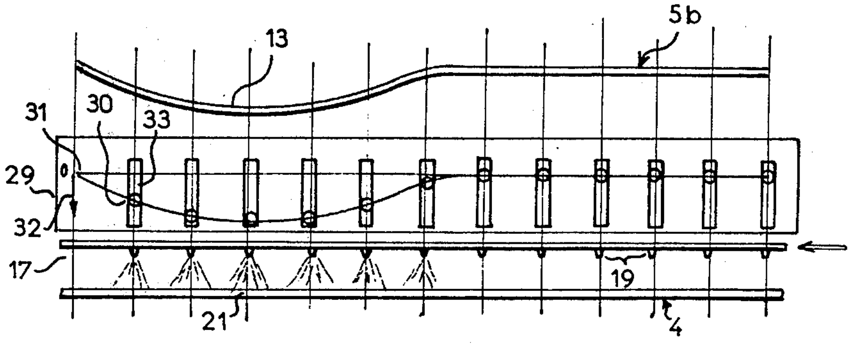
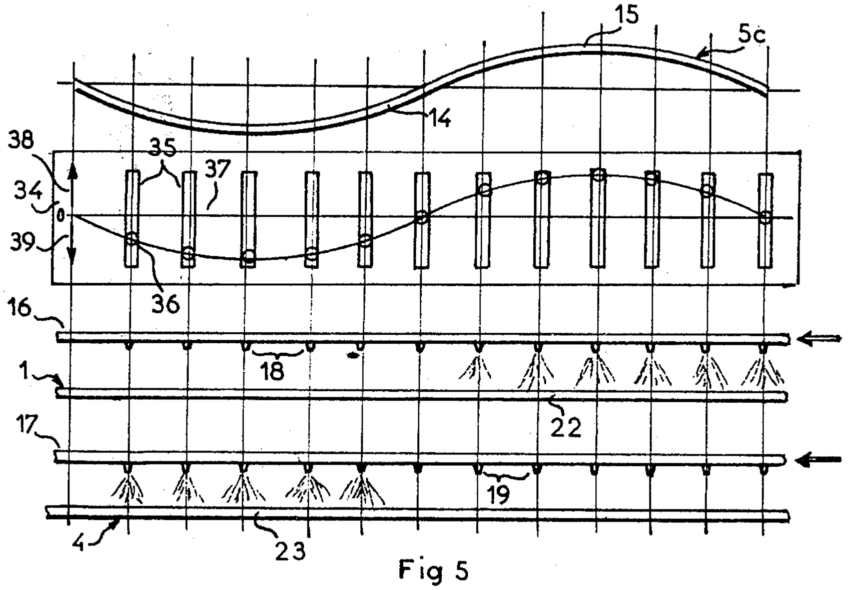
Fig 5

HUMIDIFIER ARRANGEMENT FOR A TRAVELLING HYDROPHILIC WEB

FIELD OF INVENTION

The present invention relates to a humidifier device for at least one web of travelling hydrophilic material.

More precisely, the invention relates to a device of this type intended to distribute the humidity in a predetermined manner over the width of the web in order to correct a tendency to warping of a material formed by the connection of this web face to face with a second web.

BACKGROUND OF THE INVENTION

Devices of this type are used in particular in the corrugated cardboard industry where it is important to establish an equilibrium of humidity on the one hand between the single-sided sheet formed by sticking a sheet of corrugated paper to a web of smooth paper and on the other hand the covering constituted by another web of paper intended to be stuck to the second side of the corrugated sheet in order to produce a double-sided sheet, if one wishes to eliminate warping of the product obtained, i.e. a transverse deformation of the latter due to the appearance of tension between the single-sided sheet and the covering at the time of the hot connection of the latter.

Naturally, this constitutes only a non-limiting example of an application to the extent that the same problem occurs each time two webs of hydrophilic material have to be connected and undergo, at the time of their connection, in particular if the latter takes place hot or after this connection, a treatment tending to dry them and consequently to cause a deformation of the product obtained in the case where its two constituents would tend to be subjected to different dimensional variations at the time of this drying.

Normally, humidifier devices comprise, opposite the path of at least one of the sides of at least one of the webs, an arrangement for spraying water directed transversely with respect to the direction of travel of the web and comprising a plurality of jets distributed over the width of the latter. For example, in the case of a machine for manufacturing corrugated cardboard processing webs of paper having a width of 2.45 meters, 12 jets are thus distributed over the width of at least one of the webs.

The rate of flow through each of the jets may be regulated independently, presently by rotating graduated knurled wheels provided at the rate of one per jet, in order to control the rate of flow through this jet through the intermediary of suitable means. Thus, depending on the transverse deformation which the finished product tends to undergo, i.e. for example the corrugated cardboard, the operator regulates the flow through the various jets by a suitable rotation of the corresponding knurled wheels, in order to supply the web with humidity modulated over its width and thus to establish an equilibrium between the respective rate of humidity of the respective areas of the two webs intended to come into contact with each other, in order that they undergo indentical dimensional variations upon drying, with the result of a flat finished product.

Generally, the two connected webs are subjected to a treatment of this type.

Generally, this regulation is effected once and for all at the beginning of the travel of a web of predetermined origin and is maintained during the passage of the entire length of the web. Nevertheless, it proves difficult, long and tedious, in particular in that it is difficult to establish a direct relationship between the graduations on the knurled wheels and the deformation observed on the finished product, depending on which one must regulate the rate of flow of the various jets by a suitable rotation of the knurled wheels.

SUMMARY OF THE INVENTION

The invention intends to remedy these drawbacks and to this end it proposes means for the individual regulation of the rate of flow through the various jets combining with a regulation corresponding to the correction of a given warpage, the analogue visualisation of this warpage, where warpage is intended to mean the deformation of the cross-section of the finished product which one wishes to remedy.

It thus becomes possible to correct instinctively, on sight, in a correct and rapid manner, a warpage observed and if necessary to intervene effectively and quickly if, after an initial correction effected at the beginning of the travel of a web, a warpage reappears during this travel.

The humidifier device according to the invention, for at least one web of travelling hydrophilic material, intended to distribute the humidity in a predetermined manner over the width of the web in order to correct a tendency to warpage of a material formed by the connection of this web face to face with a second web and to this end comprising a plurality of jets distributed transversely with respect to the direction of travel of the first web, opposite the path of at least one side of the latter and means for the individual regulation of the rate of flow through each jet, is characterised in that the means for the individual regulation comprise for each jet a slide for regulating the rate of flow of this jet, the various slides corresponding to the various jets being able to move longitudinally on a common control table so that the position of the slides on this table for a given regulation visualises the shape of the cross-section of the material which is corrected by this regulation.

BRIEF DESCRIPTION OF DRAWINGS

The invention will be better understood on referring to the ensuing description, relating to a non-limiting embodiment and to the accompanying drawings which form an integral part of this description.

FIG. 3 shows an embodiment of a table according to the invention adapted to the correction of so-called inverted warpage and illustrates its use diagrammatically on cross-sections of the finished product and of the single-sided sheet in the region of the jets.

FIG. 4 is a view of a control table according to the invention more particularly adapted to the correction of a so-called normal warpage and illustrates diagrammatically its use by cross-sectional views respectively of the finished product and of the covering, in the region of the jets.

FIG. 5 shows a control table according to the invention adapted to correcting both inverted warpage and normal warpage and illustrates its use diagrammatically in cross-sectional views respectively of the finished product, of the single-sided sheet in the vicinity of the jets and of the covering in the vicinity of the jets.

DESCRIPTION OF PREFERRED EMBODIMENTS

Figure 1:
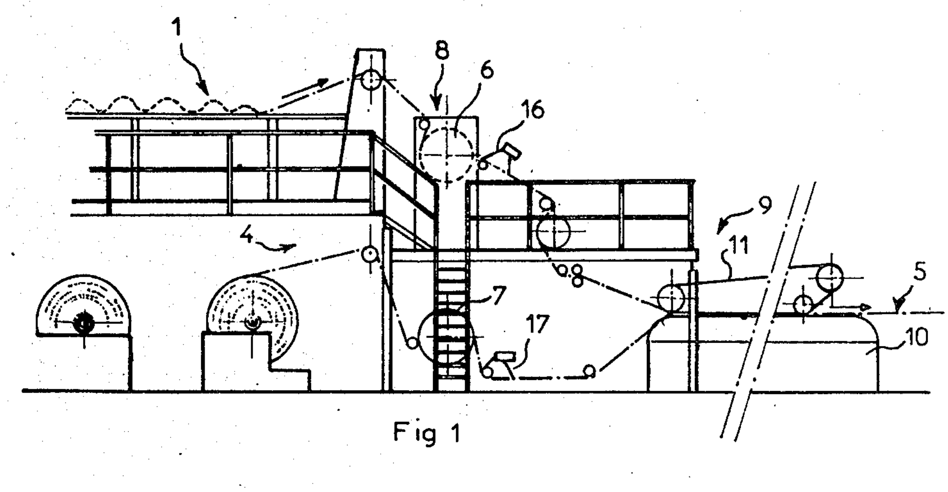
FIG. 1 is a side view of a machine for the manufacture of corrugated cardboard using the invention.
Figure 2:
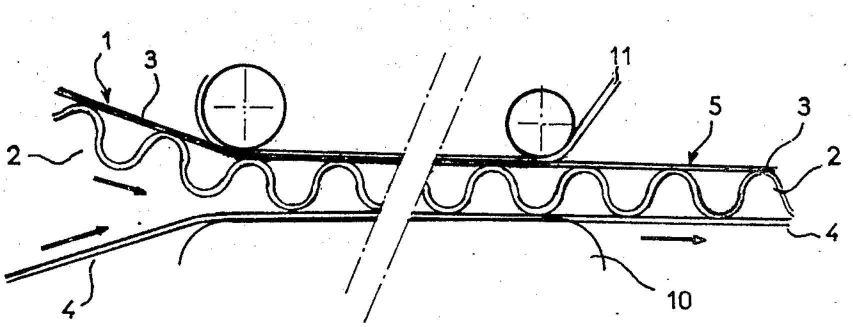
FIG. 2 is an enlarged side view of the area of the machine where the single-sided sheet and the covering are connected to each other.

The reference numeral 1 designates generally a single-sided sheet, formed by the face to face connection of a sheet of corrugated paper 2 and a web of paper 3, the reference numeral 4 designates a covering constituted by a web of paper and the reference numeral 5 designates the finished product resulting from the connection of this web of paper 4 to the side of the corrugated sheet 2 remote from the side of the latter connected to the web 3. The connection of the single-sided sheet 1 and the covering 4 takes place generally by heat-sealing, as in the example illustrated, their sides which are intended to come into mutual contact and to be connected being coated with a layer of a suitable heat-sealing material (not shown).

To this end, the materials 1 and 4 appropriately coated, which are in the form of webs of equal width and the length of which is very much greater than this width, are entrained and guided to travel in their own longitudinal direction in a machine such as illustrated in FIG. 1, where they pass in succession through a pre-heating station 8, where the webs 1 and 4 are brought into contact with heating rollers respectively 6 and 7 which soften the heat-sealing coating and a connecting station 9 where they are placed in close mutual contact by their sides intended to be connected and made to travel, in their longitudinal and thus common direction, against a heating table 10 on which the web 4 is supported by its side remote from the side intended to be connected to the corrugated sheet 2. The side of the material 1 remote from the side where it is connected to the web 4, i.e. the free side of the sheet 3, in turn bears against an endless conveyor 11 placed opposite the heating table 10, which conveyor 11 constituting a counter-part to the heating table 10, tends to keep the materials 1 and 4 pressed firmly one against the other, thus promoting their travel in their longitudinal and common direction. The length of the table 10, measured parallel to this direction and the speed of travel of the materials 1 and 4 against the latter are established so that when the arrangement formed by the superimposition of the materials 1 and 4 leaves the connecting station 9, after cooling, it forms an integral unit which constitutes the web of corrugated cardboard 5. For example, the length of the heated table is of the order of 20 meters for a travelling speed of materials 1 and 4 of the order of 200 meters per minute. These numbers being given as a non-limiting example.

The web 5 of corrugated cardboard, which is normally flat, i.e. of substantially rectilinear cross-section, may comprise various faults, resulting in different cross-sections, if the materials 1 and 4 are subject to different dimensional variations in the vicinity of the connecting station 9. One can thus observe inverted warpage, illustrated in FIG. 3 by a cross-section of a product 5*a* of which it can be seen that the sides corresponding to the sheet 3 of material 1 and to the sheet 4 respectively have a convex section and a concave section on a part 12 of the width of the product, which is otherwise flat. One can also observe normal warpage illustrated in FIG. 4 over a cross-section of a finished product 5*b* which, otherwise flat, has in a part 13 of its width, a convex section of its side corresponding to the sheet 4 and a concave section of its area corresponding to the sheet 3 of material 1. The two faults may be observed on the same product as shown in FIG. 5, where a product 5*c* seen in section through a transverse plane has normal warpage on a part 14 of its width and inverted warpage on the other part 15 of its width.

In order to correct these faults when one begins to notice them on the product 5 leaving the station 9, i.e. in order to eliminate them from the material 5 subsequently manufactured, there is provided upstream of the connecting station 9, taking into account the direction of travel of the materials 1 and 4, a sprinkler bank 16, located for example immediately upstream or immediately downstream of the pre-heating roller 6 (the second solution is illustrated in FIG. 1) and a spray bank 17 located for example immediately downstream of the pre-heating roller 7, respectively transversely with respect to the direction of movement of the material 1 and opposite the side of the latter corresponding to the sheet of paper 3, over the entire width of the latter and transversely with respect to the direction of movement of the material 4, opposite one of the sides of this material and over the width of the latter.

In certain cases, it is possible to provide only one of these banks, namely the bank 16 as shown in FIG. 3 or the bank 17 as shown in FIG. 4, which makes it possible to correct inverted warpage and normal warpage respectively, but preferably one may provide these two banks on the same installation in order to correct both inverted warpage as well as normal warpage as shown in FIG. 5.

As is apparent from FIGS. 3 to 5, the banks 16 and 17, connected to a water supply which is not shown but indicated diagrammatically by an arrow, comprise a plurality of jets 18 and 19 respectively, distributed in a uniform manner over their useful length, i.e. over their area opposite the path of one side respectively of the material 1 and of the material 4 and the rate of flow of water through each of these jets may be regulated independently of the regulation of the other jets, between a zero value and a pre-determined maximum value.

In known manner, the deformation suffered by the product 5 in a pre-determined area of its width is corrected by sprinkling water in the corresponding area of the material constituting this product defining the convex side of the latter in the area in question, with a localised sprinkling rate directly dependent on the warpage suffered by the product in this area, with respect to a flat configuration.

Thus, in the case of the inverted warpage illustrated in FIG. 3, it is the area 20 of the material 1 corresponding to the area 12 of the product which is sprinkled with water, by opening the corresponding jets 18 to a greater extent the greater the deflection suffered by the material 5*a* with respect to a flat configuration, in the area of this material corresponding to the area of the material 1 opposite which they are situated. The other jets are closed. In the case of FIG. 4, it is the jets 19 located opposite the area 21 of the material 4 corresponding to the area 13 of the finished product 5*b* which are open, with a rate of flow which is also dependent on the warpage of the product in the area sprinkled respectively by each of them. The other jets 19 are closed. In the case of FIG. 5, the jets 18 located opposite the area 22 of the material 1 corresponding to the area 15 of the finished product 5*c* and the jets 19 located opposite the area 23 of the material 4 corresponding to the area 14 of the finished product 5*c* are open, depending on the warpage undergone by the product 5c in the area corresponding to the latter, the other jets being closed. This individual regulation of the rate of flow through each jet 18 or 19, obtained by any means, is controlled manually, in the case of the invention, by means of slides whereof each corresponds to one of the jets and which are moved on a control table between a position corresponding to zero flow and a position corresponding to maximum flow.

According to the invention, the slides corresponding to the various jets of the same bank and preferably of two banks when two banks are provided, are combined on the same control table and arranged so that their position on the table for a given regulation visualises the shape of the cross-section of the material 5, respectively 5a, 5b, 5c which is corrected by this regulation.

Thus, in the case of FIG. 3, slides 25 are combined on the same control table 24, the number of which slides is identical to the number of jets 18 in the bank 16 and whereof each controls the means opening one of these jets to a greater or lesser extent respectively. The various slides 25 are able to move longitudinally on the table 24 in parallel directions, materialised by slideways 26 juxtaposed in the same order and distributed along the table 24 in the same manner as the jets 18 controlled respectively by the slides 25 to which they correspond, along the bank 16, the positions of the various slides 25 on the corresponding slideways 26 for which the rate of flow through the jets 18 is zero are aligned along a segment of a straight line 27 which visualises a flat cross-section of the product 5, for which no correction and consequently no application of humidity is required. A position of a slide 25 respectively further and further away from the line 27, in the same direction 28, on the corresponding slideway 26 corresponds to an increasing rate of flow of the jet 18 corresponding to this slide, identical positions of two slides 25 with respect to the line 27 corresponding to identical rates of flow through corresponding jets 18.

Thus, taking into account the fact that the deformation of the area 12 of the product 5a is corrected by an application of humidity to the area 20 of the material 1, with a rate of flow through each jet which increases or decreases with the warpage comprised by the area of the product 5a, relative to a flat configuration, which area corresponds to the area of the material 1 which is opposite a given jet 18, the curve drawn by the various slides 25 when the regulation of the rates of flow through the various jets 18 is suitable for correcting inverted warpage 12 forming an analogue visualisation of the cross-section of the warped product 5a. In particular, a position of the slides 25 along the line 27 of zero rates of flow corresponds to the flat area of the product.

Similarly, if we refer to FIG. 4, corresponding to each of the jets 19 of the bank 17, on a single control table 29, is a slide 30 whereof the longitudinal movement parallel to a common direction 32, with respect to a common line 31 of zero rates of flow, is representative of the warpage which the application of water by this jet tends to correct. As in the case of FIG. 3, the slideways 33 for guiding the various slides 30 are disposed along the table 29, parallel to the direction 32 and perpendicular to the line 31, in the same order and with the same distribution as the jets 19 to which they correspond, along the bank 17.

Thus, for a regulation of the respective rates of flow through the various jets 19 correcting a given normal warpage, the position of the various slides on the table 29 represents the cross-section of the warped product 5b.

In the case of FIG. 5, taking into account the fact that inverted warpages are corrected by spraying by means of different banks, i.e. different jets, slides have been combined on the same table, which slides able to move on either side of a line of zero rates of flow common to all the jets 18 and 19, control the rate of flow through a jet 18 or through a jet 19 according to whether they are disposed respectively on one or the other side of the line of zero rates of flow.

In this case, the jets 18 and 19 are distributed in an identical manner respectively along the bank 16 and along the bank 17, i.e. with respect to the direction of the width respectively of the travelling material 1 and of the travelling material 4. In the same order as these jets and with the same distribution as the latter, a single control table 34 comprises parallel slideways 35 along each of which moves a slide 36 controlling the rate of flow through the jets 18 and 19 located respectively on the bank 16 and on the bank 17 in the same position as the slideway 35 which comprises the latter on the table 34. Each of the slideways 35 extends respectively on either side of a segment of a straight line 37 common to all the slideways and which defines the position of the slide 36 corresponding to a zero rate of flow on each of these slideways. The positions of the slide 36 respectively further and further away from the line 37 on the slideways 35, in the same direction 38, correspond to spraying by the jets 18 of the bank 16, with a rate of flow through a pre-determined jet 18 which is all the greater the further the corresponding slide 36 from the line 37, similar positions of two slides with respect to this line corresponding to the same rate of flow of the corresponding jets 18. Similarly, a position of a slide 36 further and further away from the line 37 in the opposite direction 39 results in a greater and greater rate of flow through the corresponding jet 19, this rate of flow being identical for two jets corresponding to slides 36 whereof the position with respect to the line 37 is identical. Since the same slide 36 corresponds to a jet 18 and a jet 19, the injection of water through one of these two jets corresponds to a zero rate of flow at the other jet.

Thus, by reproducing on the table 34, by means of the various slides 36 which are positioned manually, the cross-section of the warped product 5c by taking the line 37 as being similar to the flat position of the latter, a regulation of the rates of flow is established by way of the various slides 18 and 19, which regulation is able to correct the deformations 14 and 15. Thus, in the example illustrated in FIG. 5, corresponding to the area 14 of the product 5c comprising normal warpage, are slides 36 offset in the direction 39 with respect to the line 37, i.e. a supply of water to the jets 19 located opposite the area 23 of the material 4 and corresponding to the area 15 comprising inverted warpage are slides offset in the direction 38 with respect to the line 37, i.e. a supply of water to the jets 18 located opposite the area 22 of the material 1. On the other hand, the other jets 18 and the other jets 19 are closed.

Naturally, once the deformation of the material 5 has disappeared, i.e. when the latter is once more flat, the regulation established for this purpose is maintained, generally until all a given material 1 and a given material 4 has passed by. Possibly, it is possible to adjust the regulation at will if the material 5 once more becomes deformed. When one begins to supply the machine with a new material 4, for example a replacement reel and/or a new material 1, coming from the arrangement of a corrugated sheet 2 and a web 3 of which at least one is new, it is generally necessary to recommence the regulation and the slides are previously replaced on the line of zero rates of flow respectively 27 or 31 or 37 in order to observe the possible deformation of the material 5 produced without the application of humidity and, reproducing this deformation on the control table, respectively 24 or 29 or 34, to apply humidity suitable to cause the latter to disappear.

Naturally, the invention may have numerous variations with respect to the method of implementation described and illustrated and it would not be outside the scope of the invention to adapt the latter to particular requirements. In particular, without diverging from the scope of the invention, a man skilled in the art could choose the method of actuation for opening or closing the various jets 18 and 19 by the corresponding slides. Furthermore, the number of jets and consequently the number of slides could vary over a large range according to requirements and in particular according to the width of product to be treated, the quantity of water to be applied thereto per unit of surface area etc. In certain cases, the same slide could control the rate of flow through a group of adjacent jets, possibly located on each side of the same travelling web.

What is claimed is:

1. A humidifier arrangement for at least one web of travelling hydrophilic material, which arrangement is intended to distribute humidity in a pre-determined manner over the width of the web in order to correct any tendency thereof towards warping of a material formed by the connection of this first web face to face with a second web, the arrangement comprising a first table over which the web can travel, a plurality of jets arranged tranversely in association with said first table and located upstream thereof with respect to the direction of travel of the first web over said first table and opposite the intended path of at least one side of the first web, and means for the individual regulation of the rate of flow of humidifying liquid through each jet, which means comprise a control table, and a slide for each jet for regulating the rate of flow through the respective jet, the various slides corresponding to the various jets being able to move longitudinally with respect to said control table so that the position of the slides on said control table for a given flow regulation provides a visualisation of the shape of the cross-section of material which is to be corrected by this regulation.

2. An arrangement as claimed in claim 1, in which the various slides are disposed on said control table so that their directions of longitudinal movement are parallel and arranged in the same manner as the corresponding jets over the width of the first web, the positions of the various slides corresponding to a zero rate of flow being in alignment and the positions of the slides corresponding respectively to increasing rates of flow being further away from the position corresponding to a zero rate of flow in the same direction and identical with respect to the position corresponding to a zero rate of flow from one slide to another for the same rate of flow through corresponding jets.

3. An arrangement as claimed in claim 1 further comprising a second plurality of jets arranged transversely upstream of said first table with respect to the direction of travel of the second web and opposite to the path of at least one side of this second web, and means for the individual regulation of the rate of flow through each jet, which means comprise a control table and a slide for each second jet for regulating the rate of flow through this jet, the various slides corresponding to the various jets being able to move longitudinally with respect to said control table so that the position of the slides on said control table for a given flow regulation provides visualisation of the shape of the cross-section of the material which is corrected by this regulation.

4. An arrangement as claimed in claim 3, in which the various slides for the second jets are so disposed over said control table that their directions of longitudinal movement are parallel and arranged in the same manner as the coresponding second jets, the positions of the various slides corresponding to a zero rate of flow being in alignment and the positions of the slides corresponding to respectively higher rates of flow being further from the position corresponding to a zero rate of flow in the same direction and identical with respect to the position corresponding to a zero rate of flow from one slide to another for the same rate of flow through corresponding jets.

5. A humidifier arrangement for two webs of travelling hydrophilic material, which arrangement is intended to distribute humidity in a selected manner over the width of said webs in order to correct any tendency thereof towards warping of a material formed by joining said webs face to face, the arrangement comprising a first table over which said webs can travel and on which they are joined, a first set of jets arranged transversely of a first web upstream of said first table to direct sprays onto said first web, a second set of jets arranged transversely of a second web upstream of said first table to direct sprays onto said second web, and means for individually regulating the rate of flow through each of said jets, said control means comprising a control table and a plurality of slides movable longitudinally on said control table, each of said slides controlling the rate of flow through a jet of said first set and the rate of flow through a corresponding jet of said second set, each of said slides having a neutral position in which the flow through said jets of said first set and said second set is zero, and being movable in one direction from said neutral position to increase the flow through said jet of said first set and movable in the opposite direction from said neutral position to increase the flow through said jet of said second set.

6. An arrangement as claimed in claim 5, in which the various slides are disposed on said control table so that their direction of longitudinal movement are parallel and arranged in the same manner as the corresponding jets over the width of said webs, the neutral position of the various slides corresponding to a zero rate of flow being in alignment and the positions of the slides corresponding respectively to increasing rates of flow being further away from said neutral positions so that the positions of the slides on said control table for a given flow regulation provides a visualization of the shape of the cross-section of material which is corrected by such regulation.

* * * * *